(12) United States Patent
Bolle et al.

(10) Patent No.: US 7,686,210 B2
(45) Date of Patent: Mar. 30, 2010

(54) STORED-VALUE EDUCATION ACCOUNT

(75) Inventors: Elaine D. Bolle, San Francisco, CA (US); Maria Martinez, Concord, CA (US); Mahala Johnson, Vallejo, CA (US); Sabrina Ko, Castro Valley, CA (US); Susan M. Milberger, Englewood, CO (US); Jackie MacFarlane, Parker, CO (US); Amy Dunker, Dallas, TX (US)

(73) Assignee: First Data Corporation, Greenwood Village, CO (US)

( * ) Notice: Subject to any disclaimer, the term of this patent is extended or adjusted under 35 U.S.C. 154(b) by 513 days.

(21) Appl. No.: 11/611,000

(22) Filed: Dec. 14, 2006

(65) Prior Publication Data

US 2007/0083477 A1    Apr. 12, 2007

Related U.S. Application Data

(63) Continuation of application No. 10/159,784, filed on May 31, 2002, now abandoned.

(51) Int. Cl.
*G06Q 40/00* (2006.01)

(52) U.S. Cl. .................. 235/379; 235/380; 235/382

(58) Field of Classification Search ............. 235/379, 235/380, 382, 383; 705/5, 8, 13
See application file for complete search history.

(56) References Cited

U.S. PATENT DOCUMENTS 6,267,292 B1 *   7/2001   Walker et al. ............... 235/379
6,354,490 B1 *   3/2002   Weiss et al. ................. 235/379

* cited by examiner

*Primary Examiner*—Ahshik Kim
(74) *Attorney, Agent, or Firm*—Townsend and Townsend and Crew LLP

(57) ABSTRACT

According to the invention, a method for funding an account with an online money transfer system using a wide area network, where the account cannot be used for purchases outside a closed purchasing community, is disclosed. In one step, information about a money handler is accepted at the online money transfer system and over the wide area network. The information includes an amount of funds, a bank routing number, a bank account number and a unique identifier. The unique identifier discriminates a buyer from other buyers in the closed purchasing community. The amount of funds is drawn with the money handler from a bank account indicated by the routing number and the bank account number. Funds are transferred to the account for benefit of the buyer indicated by the unique identifier. The funds cannot be used outside the closed purchasing community while in the account.

25 Claims, 12 Drawing Sheets

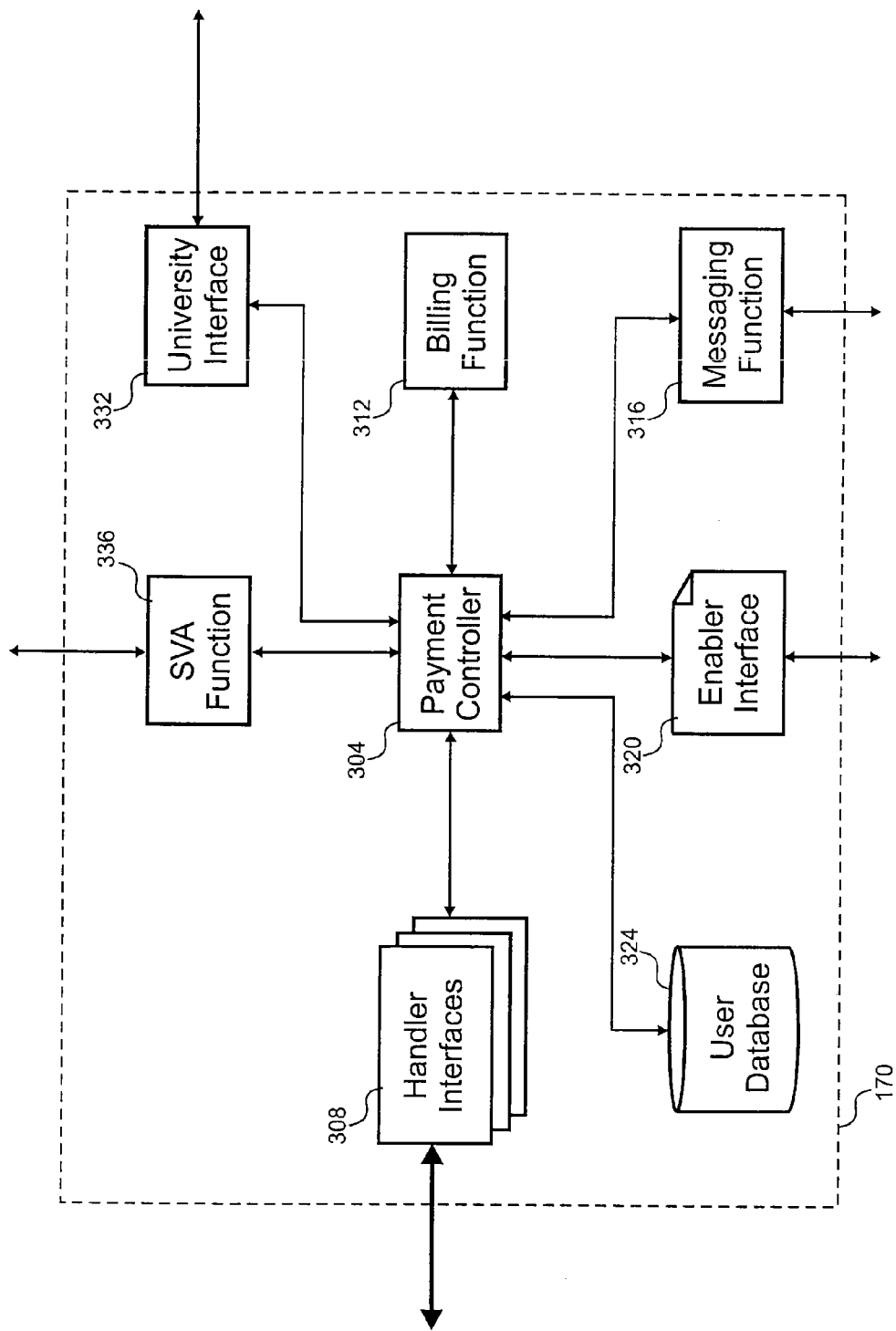

STORED-VALUE EDUCATION ACCOUNT

CROSS-REFERENCE TO RELATED APPLICATIONS

This application is a continuation application of U.S. patent application Ser. No. 10/159,784, entitled STORED VALUE EDUCATION ACCOUNT," filed May 31, 2002 by Bolle et al., which was abandoned on Jan. 5, 2007. The foregoing application is incorporated herein by reference for all purposes.

BACKGROUND OF THE INVENTION

This invention relates in general to educational payment systems and, more specifically, to methods and apparatuses for using educational payment systems.

In the university setting, meal cards are used to allow students to purchase meals from their meal plan or a value associated with the card. In some cases, the meal card also serves as a student identification card. The student pays for a particular meal plan or to add a particular value to their card using a check, cash, or credit card. Paying with a check can be done on-line, but paying with a check or cash requires visiting a physical location, paying by mail, or otherwise interfacing with a human.

If value is added to the card, accounts are maintained to store the value for each student. These accounts are maintained by the university and debited whenever a transaction is made. In some circumstances, the cards that may be tied to a credit card. Using the card to purchase items results in a charge to the associated credit card. In some cases, the cards can be used to purchase items other than meals.

BRIEF DESCRIPTION OF THE DRAWINGS

The present invention is described in conjunction with the appended figures:

FIG. 3C is a block diagram of yet another embodiment of the payment enabler with the stored value account function and the university interface;

Figure 1A:
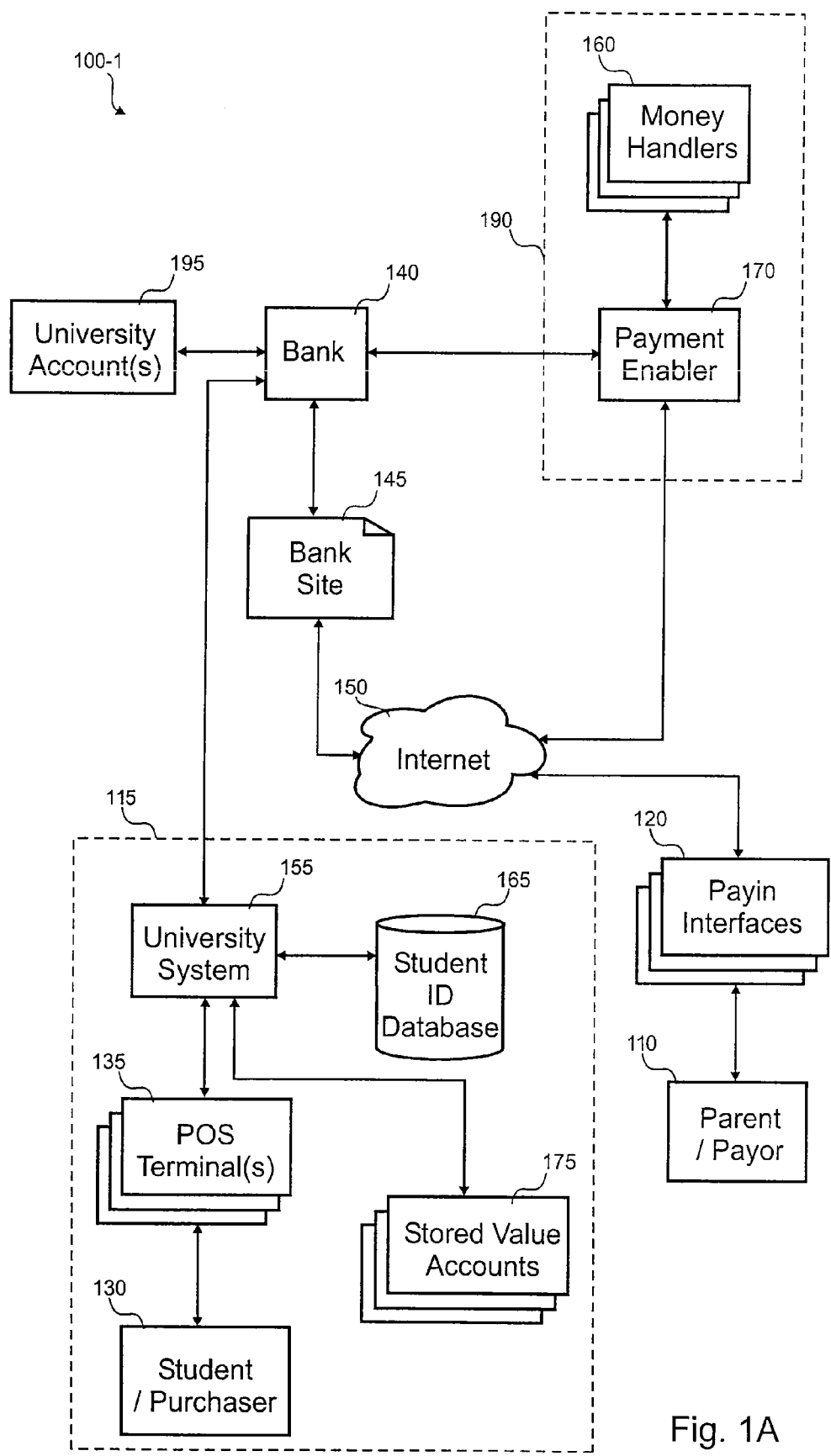
FIG. 1A is a block diagram of an embodiment of a purchase system that maintains stored value accounts within a purchasing community.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a method for funding an account with an online money transfer system using a wide area network, where the account cannot be used for purchases outside a closed purchasing community, is disclosed. In one step, information about a money handler is accepted at the online money transfer system and over the wide area network. The information includes an amount of funds, a bank routing number, a bank account number and a unique identifier. The unique identifier discriminates a buyer from other buyers in the closed purchasing community. The amount of funds is drawn with the money handler from a bank account indicated by the routing number and the bank account number. Funds are transferred to the account for benefit of the buyer indicated by the unique identifier. The funds cannot be used outside the closed purchasing community while in the account.

In another embodiment, the present invention provides a method for funding a stored value account with an online money transfer system using a wide area network, where the stored value account is used in a purchasing community. In one step, a first request to interface with the online money transfer system is received from another site on the wide area network. Information is accepted about a money handler at the online money transfer system and over the wide area network. A unique identifier is determined from the information. Money is transferred from the money handler to the stored value account associated with the unique identifier. A second request is received to debit the stored value account. The stored value account is debited in response to the receiving the second request. The purchasing community is credited after the stored value account is debited.

In yet another embodiment, the present invention provides a payment system for a closed purchasing community where stored value accounts are funded over a wide area network (WAN). The payment system includes a number of point of sale (POS) terminals, a database, a number of indicators, and an online money transfer system. The POS terminals are associated with the closed purchasing community. The database includes a unique identifier for each of a plurality of participants in the purchasing community. The number of indicators are presented at the POS terminals that allow determining the unique identifier. Each indicator has a credit amount associated therewith. The online money transfer system is separate from the closed purchasing community and obtains the credit amount from a bank handler.

Referring first to FIG. 1A, a block diagram of an embodiment of a purchase system 100 that maintains stored value accounts 175 within a purchasing community 115 is shown. In this embodiment, a bank 140 provides an initial contact point for parents 110 wanting to fund an account with the purchasing community 115 for the student 130. For certain payment types, the bank site hands the parent off to an online money transfer system (OMTS) to process the payment to one or more university accounts 195 hosted by the bank 140. Once funded, the balance is recorded in a stored value account 175 associated with the student such that purchases can be made in the purchasing community 115. In this embodiment, the stored value account is only available for use within the purchasing community 115, but other embodiments could expand the usage to outside the purchasing community 115.

The purchasing community 115 is a closed realm of one or more vendors to sell goods and services to the students. Examples of things sold in the purchasing community include meal plans, books, school fees, parking, etc. Included in the purchasing community 115 are a university system 155, point of sale (POS) terminals, a student identifier (ID) database, stored value accounts, and one or more students 130. Each student or member 130 of the community 115 has a unique identifier readable from an identity card, radio frequency identifiers (RFIDs), token, or other machine-readable medium. The unique identifier is used to debit a purchase against a stored value account 175 of the student 130 associated with the unique identifier. In this embodiment the purchasing community is a university, but in other embodiments it could be a hospital, a corporation, an amusement park, a ski resort, a transportation system, etc.

The university system 155 includes a computer system in communication with other portions of the purchasing community 115. In this embodiment, the university system is coupled to the student ID database 165 to provide authentication of identity when a unique identifier is presented. Some embodiments may have other repositories that mirror some or all of the information in the student ID database 165 such that a connection to the master student ID database 165 is not always necessary. The university system 155 communicates with the bank 140 to know the status of funds added to the payment system 100.

Status information is recorded in stored value funds 175 as part of accounting done by the university system 155 when credits and debits are made. When funds are added to the university account 195 with the bank 140, a corresponding credit is added to the stored value account 175 of the student 130. Purchases are debited from the stored value account 175 for the student while the purchasing community can note the realized payment. In this embodiment, the stored value accounts 175 store no actual funds and serve to record the amount of credit associated with a unique identifier. The credit in the stored value accounts 175 is only negotiable within the purchasing community 115. The actual money is stored with the bank 140.

The POS terminals 135 are typically positioned near checkout for merchants or student service locations. These terminals 135 are in communication with the university system 155 to authenticate unique identifiers stored in the student ID database 165 and to authorize the debit from the stored value accounts 175. The unique identifier manually entered by the clerk or is machine read from the card or token using a RFID reader, a bar code reader, a magnetic card reader, a smart card reader, etc. A receipt is printed by the POS terminal 135, which may include balance information of the stored value account 175. Statements including all transactions may be mailed to the students 130 and/or made available online.

The parent or whomever 110 is adding funds to the purchase system 100 interfaces with the system 100 using a payin interface 120. This interface 120 allows entry of information used to interface with money handlers 160 that may provide the funds credited to the students 130. Information such as a credit card numbers, a payor name, the unique identifier, a bank account number, a routing number, etc. are gathered with this interface 120. The payin interfaces 120 communicate with the Internet 150 or some other wide area network with a bank web site 145 and the OMTS 190. Some embodiments could use the Internet 150 to interact with the purchasing community 115 to provide information about the account funding or to allow students to purchase from the community 115. Further discussion of payin interfaces 120 is provided below in relation to FIG. 2.

The bank 140 in this embodiment markets the ability to fund the stored value accounts 175, although the purchasing community 115 and/or OMTS 190 could also be involved in the promotion. In this embodiment, the bank 140 is used to initiate the funding process. The parent could 110 call or visit the bank to add funds to the system 100. However, the payin interfaces 120 allow performing the funding remotely. The bank may provide several funding options and rely upon the OMTS 190 for other alternative options. For example, the bank may allow paying in person with cash, a check, and/or a debit/credit card; paying with the payin interface 120 using a debit/credit card processed with the systems of the bank and/or transfer of funds from another account with that bank 140; paying in person or on the phone with the purchasing community using electronic checks, debit/credit cards, bank transfers, stored value account transfers, and/or cash; or, paying with the payin interface 120 using the OMTS 190 systems for accepting electronic checks, debit/credit cards, bank transfers, stored value account transfers, and/or cash. A bank can design the alternatives most appropriate for their situation.

The bank has a university account 195 that receives the funds from whatever source. That account 195 could have trust sub-accounts for all the unique identifiers that have contributions associated therewith. Also, the unused funds could be held in trust in one account and have realized funds transferred to another account once purchases are made. This other account could be used by the purchasing community or university as it saw fit.

Associated with the bank 140 is a bank web site 145. This bank site 145 may serve many purposes, but at least provides a way to add funds using internal bank transfers, credit/debit cards and/or other methods that use the systems internal to the bank 140. Also the bank site 145 can hand-off parents to a web site of the OMTS 190 when the funds are to originate from the OMTS 190.

The bank 140 has an interface to the OMTS 190 to receive those funds. This interface could include the ACH network, wire transfer mechanisms, bank transfer mechanisms, the sending of checks, etc. Once the parent 110 is handed off to the OMTS 190 communication from the OMTS 190 provides the bank 140 status on the funding process. In this embodiment, the parent 110 is returned to the bank site 145 once the funding is completed. As purchases are made in the community 115, transaction information could be passed to the bank 140 and OMTS 190 such that either could provide electronic statements available to the parent 110 and/or student 130. Some embodiments may have the university system 115 provide these electronic statements in addition to any paper statements.

The OMTS 190 serves as the exclusive or an alternative funding source for the university account 195 for the benefit of a stored value account 175 of a student. Included in the OMTS 190 are a payment enabler 170 that provides an interface to the parent 110 when configuring funding from one or more money handlers 160 and money handlers 160 that serve as the source of funds. Identification information from the parent is verified against the student ID database 165 to be sure the proper stored value account 175 is funded. The money handlers 160 are typical sources of funds for payments, for example, credit/debit card companies, banks, retail locations, etc.

Figure 1B:
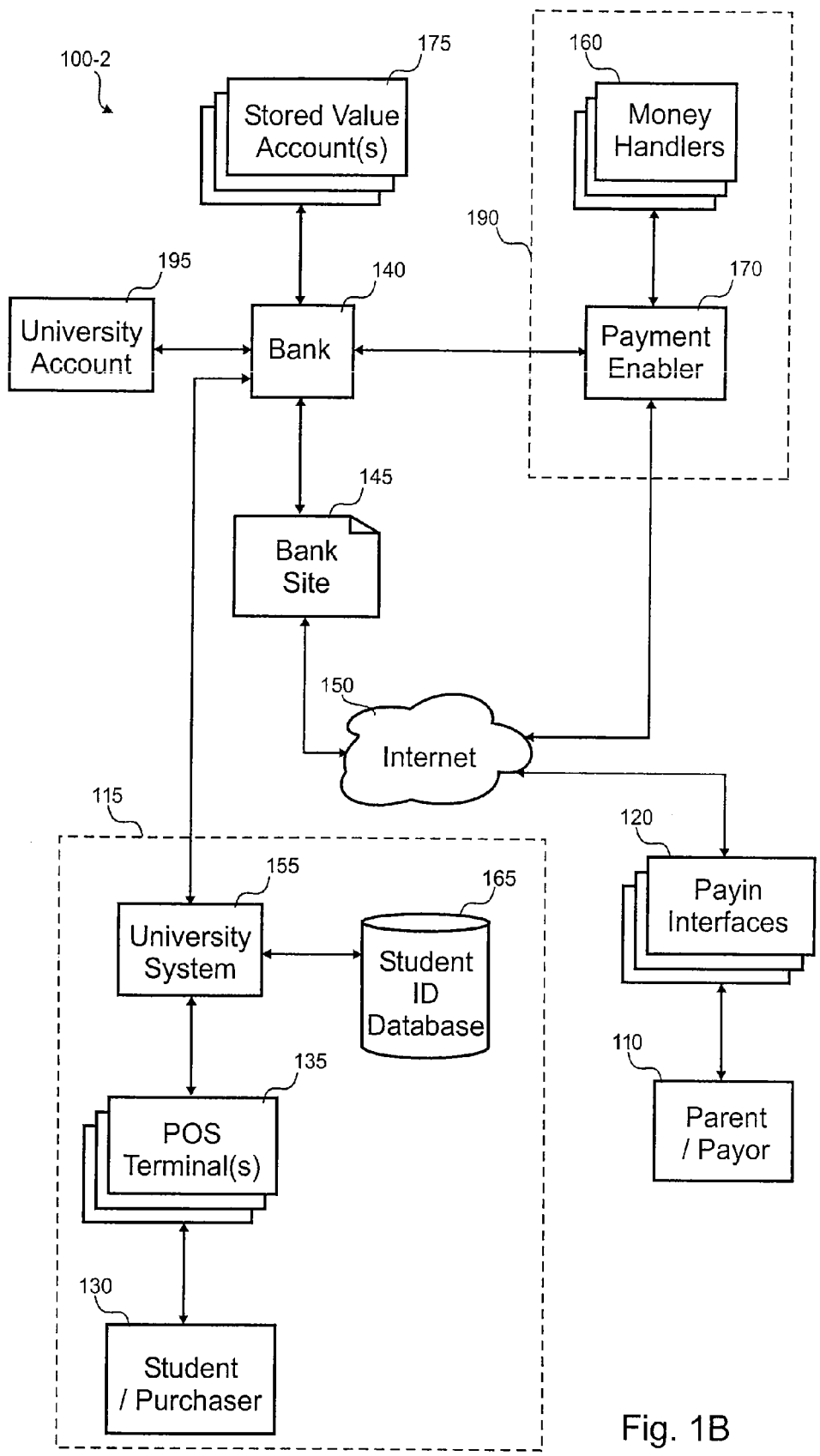
FIG. 1B is a block diagram of another embodiment of the purchase system that maintains stored value accounts with a bank.

With reference to FIG. 1B, a block diagram of another embodiment of the purchase 100-2 system that maintains stored value accounts 175 with a bank 140 is shown. The stored value accounts 175 are accessible by the POS terminals over a network, direct connection or the like such that debits can be recorded. The bank 140 receives new funds for the benefit of a student and updates the corresponding stored value account 175 accordingly. In another embodiment, the stored value accounts 175 could be replaced with regular bank accounts funded in the aforementioned ways. When a purchase is made by the student 130, the bank 140 would transfer funds from the student's bank account to the university bank account 195 with the bank 140 and/or the OMTS 190 managing the transfers with information from the purchasing community 115.

Figure 1C:
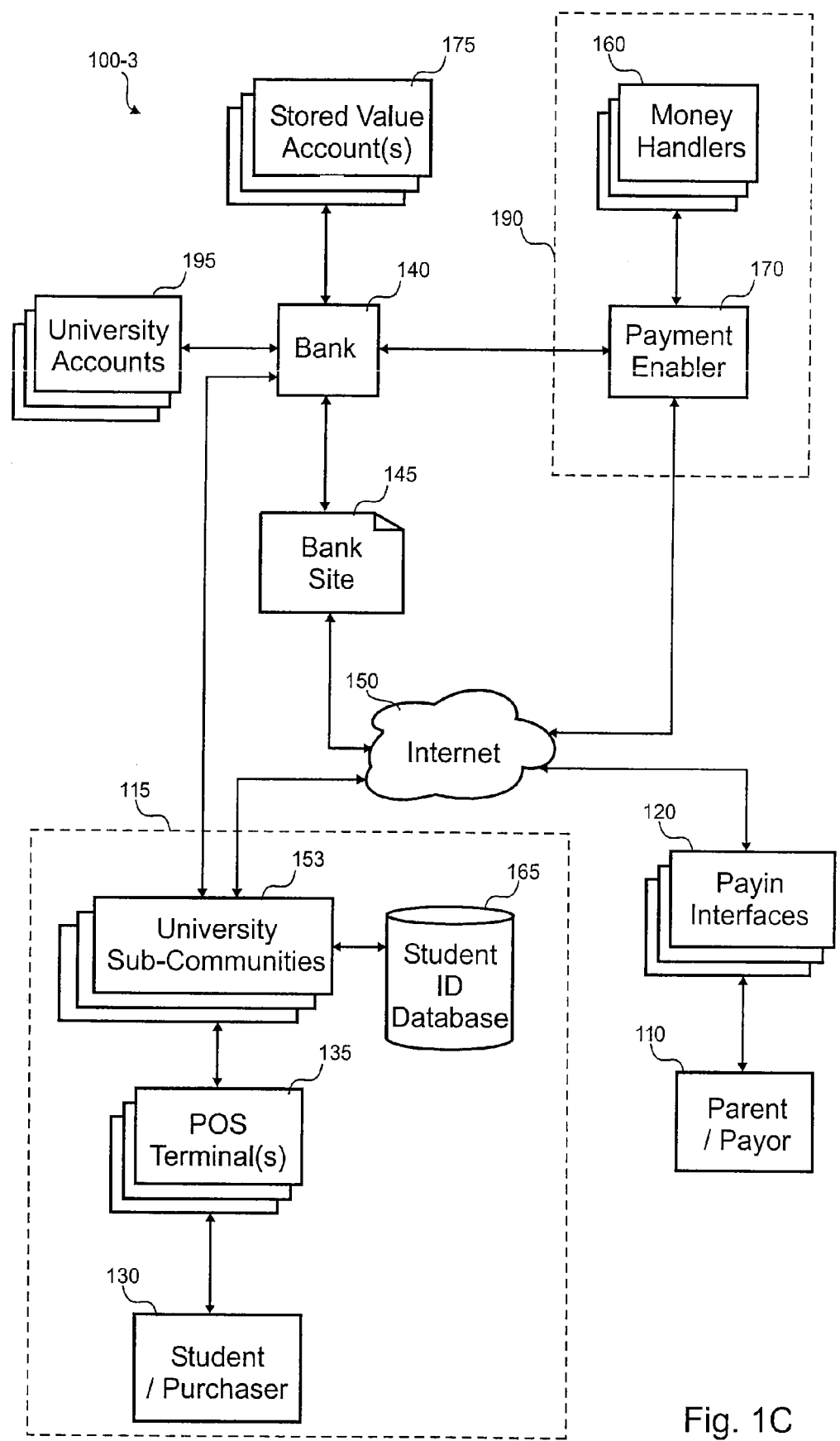
FIG. 1C is a block diagram of yet another embodiment of the purchase system where the purchasing community is divided into sub-communities.

Referring to FIG. 1C, a block diagram of yet another embodiment of the purchase system 100-3 where the purchasing community 115 is divided into sub-communities 153 is shown. When the payment is made by the parent 110, a sub-community is selected for targeted funding. Only purchases within that sub-community can draw down the funds associated with that sub-community. Examples of these sub-communities divided along product category include cafeterias, book stores, housing, tuition, and fees. Alternatively, the sub-communities 153 could be divided by vendor or any other model adopted by the purchasing community 115.

In this embodiment, there are a number of university accounts 195 divided by purchasing sub-community 153 to aggregate payments from all parents for each sub-community 153. Each stored value account 175 has entries for each sub-community such that a student's credits are kept segregated. When a purchase is made, the POS terminal 135 knows the sub-community 153 associated with the goods or services. That sub-community 153 is contacted to verify the unique identifier of the student 130, and query the status of the portion of the stored value account 175 associated with that student 130.

Figure 1D:
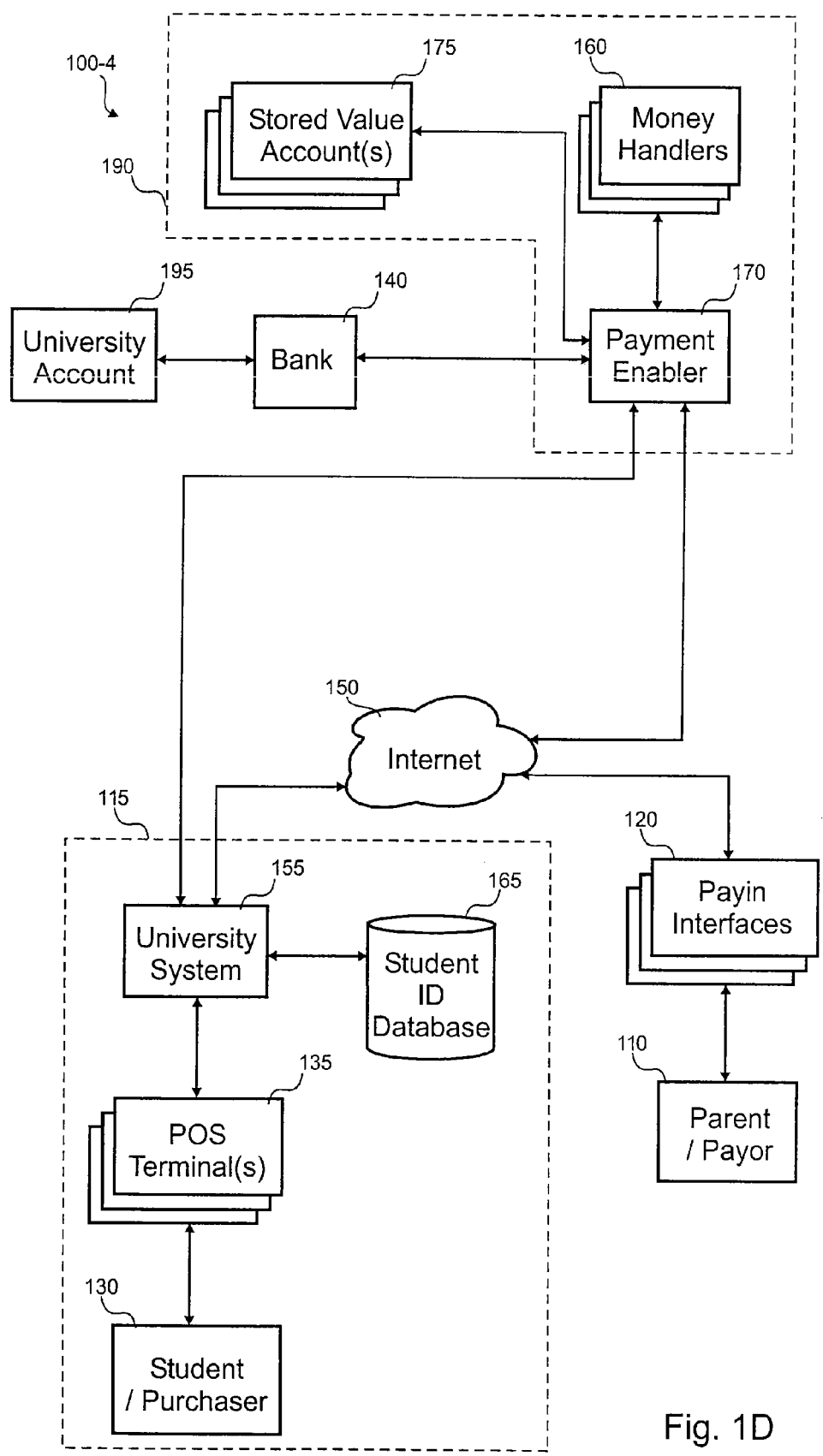
FIG. 1D is a block diagram of still another embodiment of the purchase system that maintains stored value accounts with an online money transfer system (OMTS)

With reference to FIG. 1D, a block diagram of still another embodiment of the purchase system 100-4 that maintains stored value accounts 175 with the OMTS 190 is shown. This embodiment has the stored value accounts 175 maintained by the OMTS 190 such that when funds are added to the university account 195 a credit is recorded in the stored value account 175. As purchases are made, the credit is reduced accordingly. The purchasing community 115 communicates with the OMTS 190 during a transaction to confirm adequate funding. The communication between the purchasing community 115 could communicate with the OMTS 190 using the Internet 150 or a dedicated connection or private network.

Figure 1E:
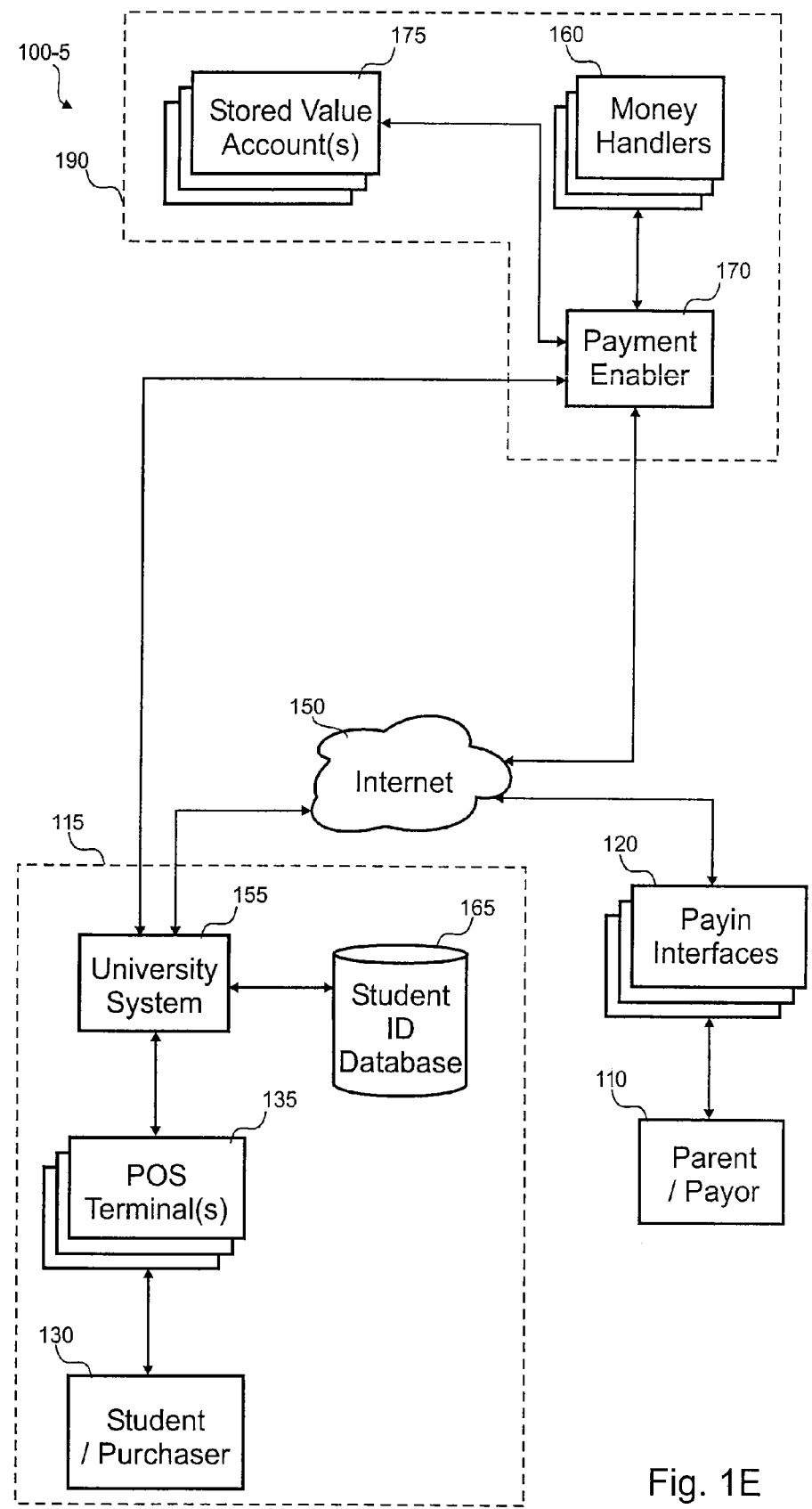
FIG. 1E is a block diagram of yet another embodiment of the purchase system that maintains stored value accounts for both the purchasing community and students.

Referring next to FIG. 1E, a block diagram of yet another embodiment of the purchase system 100-5 is shown that maintains stored value accounts 175 for both the purchasing community 115 and the students 130. Funds are added by parents 110 to the stored value account 175 for their student 130. When a purchase is made, the purchasing community 115 verifies funds with the OMTS 190 before causing a transfer from a student's stored value fund 175 to the university's stored value fund 175. The university can transfer money from the OMTS 190 by using one of the money handlers 160.

Figure 2:
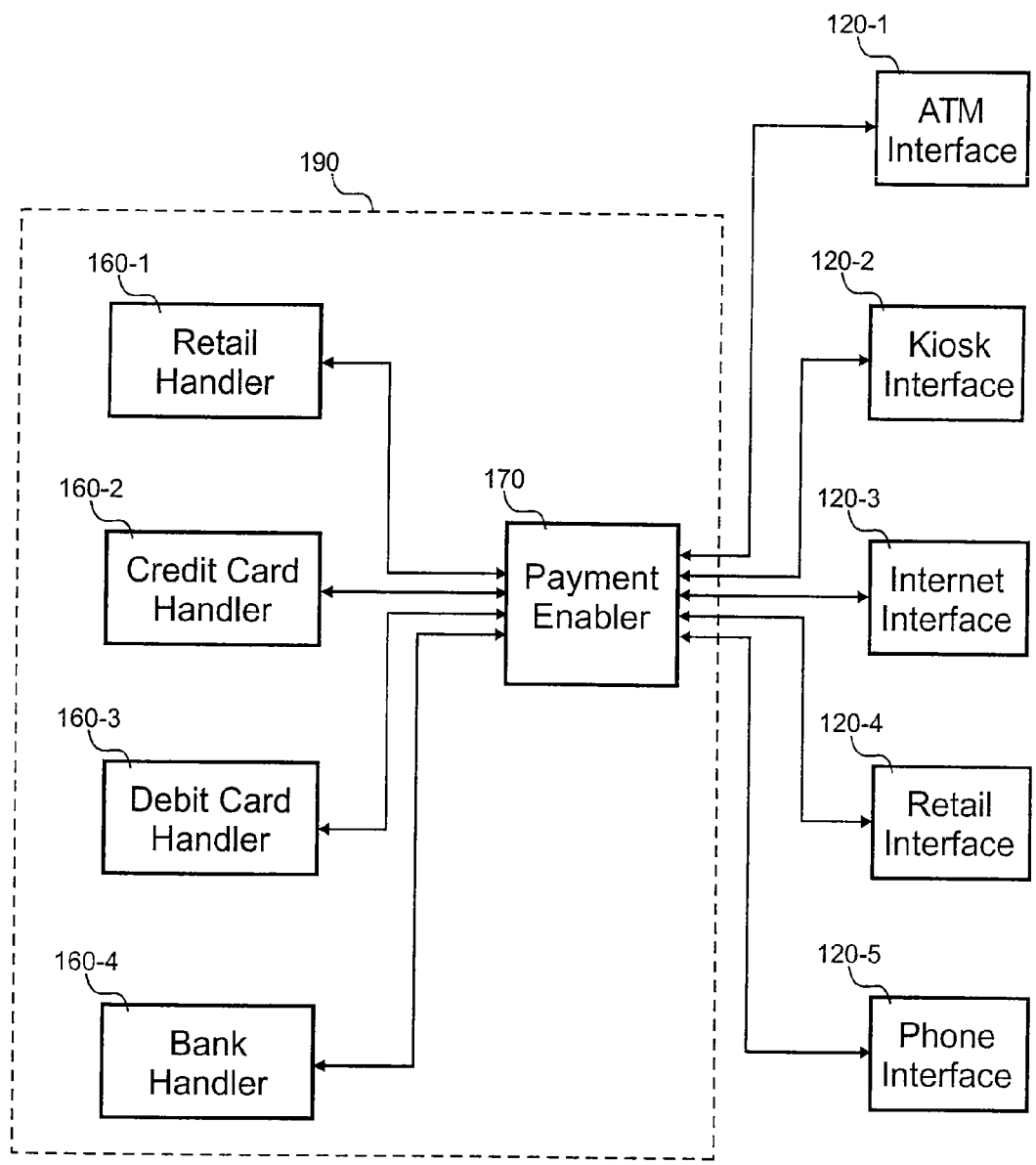
FIG. 2 is a block diagram of an embodiment of the OTMS.

With reference to FIG. 2, a block diagram of an embodiment of the OTMS 190 is shown. This embodiment supports four different handlers 160 and five different payin interfaces 120. The payin interfaces 120 are shown directly connected to the payment enabler 170, although they could be coupled by indirect means such as a network or the Internet 150.

They money handlers 160 include a retail handler 160-1, a credit card handler 160-2, a debit card handler 160-3, and a bank handler 160-4. These handlers 160 allow for funding stored value accounts 175 and bank accounts 195, and can be used to transfer funds out these accounts 175, 195 if necessary. The debit/credit card handlers 160-2, 160-3 are credit card companies and the parents can enter card information such that money can be transferred in this manner. The retail handler 160-1 is a physical location that can accept money to fund a stored value account 175 or can payout money in check or cash form. Electronic transfers with banks are performed with the bank handler 160-4 using, for example, the ACH network, wire transfers or other electronic interbank transfers. Information such as a bank routing number and account number are entered to facilitate the bank transfers.

As mentioned above, this embodiment has five different types of payin interfaces 120. Each of those types could have many interfaces 120 distributed about. These interfaces 120 allow entry of information for funding the student accounts 175, such as the unique identifier of the student, the amount of credit, the particulars for a selected money handler 160, etc. A automated teller machine (ATM) interface 120-1 could be part of a convention ATM, but with added functionality for entering information for funding the stored value accounts 175. A kiosk interface 120-2 is a public Internet terminal with limited functionality that at least allows funding of student accounts. Similarly, an Internet interface 120-3 allows interfacing with the bank site 145 and payment enabler 170, but could be located anywhere the parent had access to a computer interfaced with the Internet 150. When using the retail handler 160, a retail interface 120-4 is used. The retail interface 120-4 is accessible to the parent and/or a clerk at the retail handler location 160 to enter the information required to payin funds. A phone interface 120-5 could be used to give the information to an operator over the phone.

The payment enabler 170 manages operation of the OMTS 190 by working with handlers 160 to make debits requested with the interfaces 120. Other functionality of the payment enabler 170 may include person-to-person payment, auction payment, payment gateway payment services, etc. Several configurations of the payment enabler 170 are used by the various embodiments to support the different configurations of FIGS. 1A-1E.

Figure 3A:
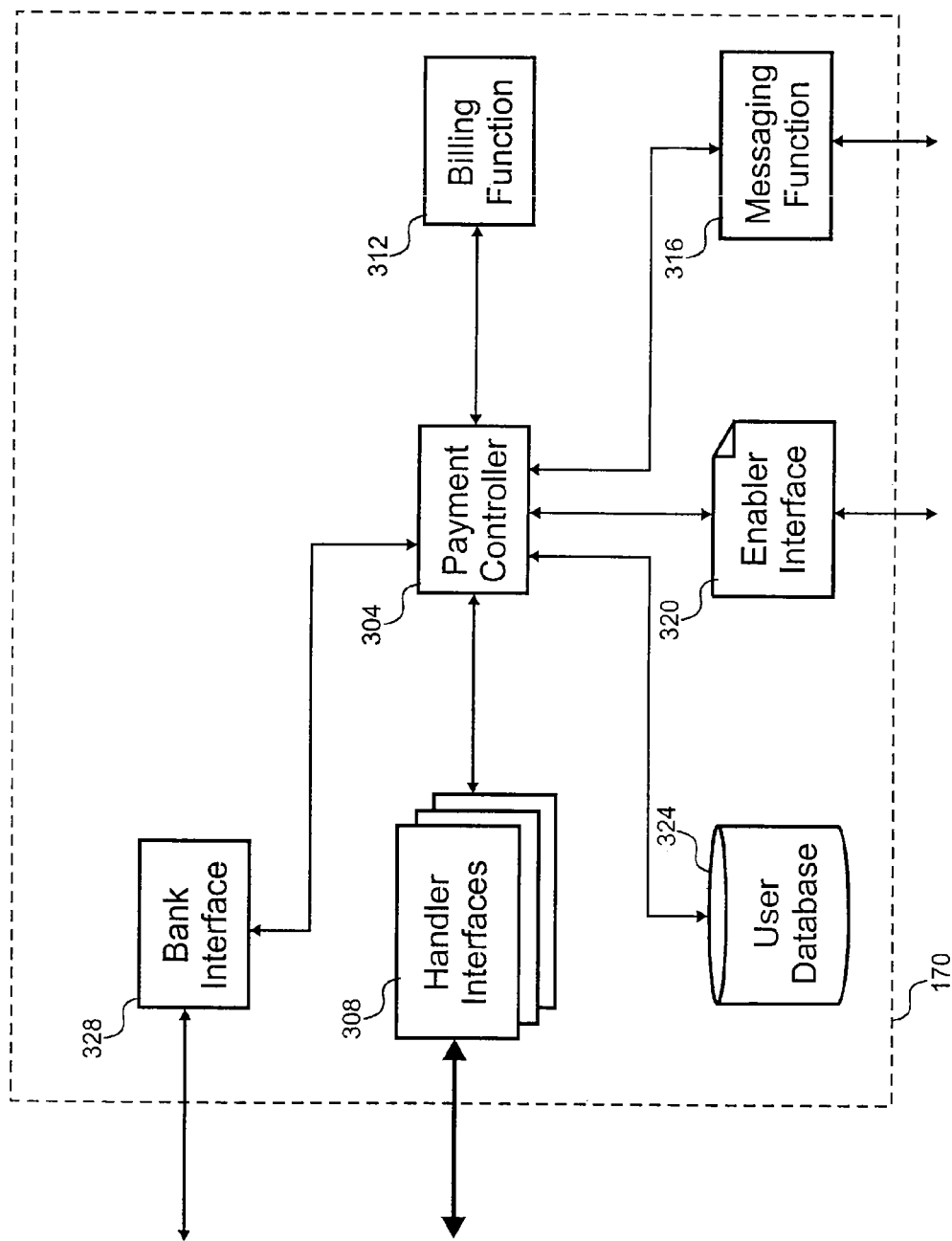
FIG. 3A is a block diagram of an embodiment of a payment enabler with a bank interface.

Referring next to FIG. 3A, a block diagram of an embodiment of a payment enabler 170-1 with a bank interface 328 is shown. This embodiment of the payment enabler 170-1 could be used with various embodiments of the payment system 100-1, 100-2, 100-3. A payment controller 304 manages operation of a billing function 312, a messaging function 316, an enabler interface 320, a user database 324, handler interfaces 308, and the bank interface 328.

The handler interfaces 308 are a number of subsystems tailored to interface with the various types of handlers 160. For example, there is bank handler interface 308 to the ACH network to allow adding and removing funds from bank accounts associated with the bank handler 160-4. The bank handler interface 308 provides all the information needed by the ACH network of the bank handler 160-4. There are also handler interfaces 308 for debit/credit card transactions and retail location transactions. The handler interfaces 308 may include various computer systems and communication links to perform their functionality. The handler interfaces 308 may also be used to verify information given to interface with the various handlers 160 such as account numbers and identities. Information used by the handler interfaces 308 to interact with the various handlers 160 is relayed by the payment controller 304 from the user database 324.

Various information is stored in the user database 324 for all the parents 110 or students 130 who interact with the OMTS 190. This information includes the unique identifier for the student 130, handler interface information, contact information from the student 130 and/or parent 110, transaction histories, and possibly, stored value account balances.

The enabler interface 320 includes web pages in this embodiment. These web pages are used by the parent 110 and student 130 when interacting with the OMTS 190. These web pages could be displayed on any of the various interfaces 120 and could be tailored to the particular interface 120. Some embodiments could use custom application software on the interface 120 to interact with the enabler interface 320, instead of a conventional web browser. Pages of the enabler interface 320 allow logging into the OMTS 190; entering handler information, contact information, unique identifier information; and, viewing balances, transactions, instructions and other information.

The messaging function 316 of the payment enabler 170 allows sending messages to the student 130 and/or parent 110. Messages may confirm the adding of funds to the parent 110 and notify the student of the availability of funds. Messages could also be sent the university and bank.

The billing function 312 tracks transactions and charges any service fees. Various embodiments may charge a transaction fee to add/remove funds or credit/debit a stored value account. In this embodiment, the fees are deducted from the funds of the student 130. Transaction information for fund transfers and/or purchases are also noted by the billing function for each unique identifier and stored in the user database 324.

Figure 3B:
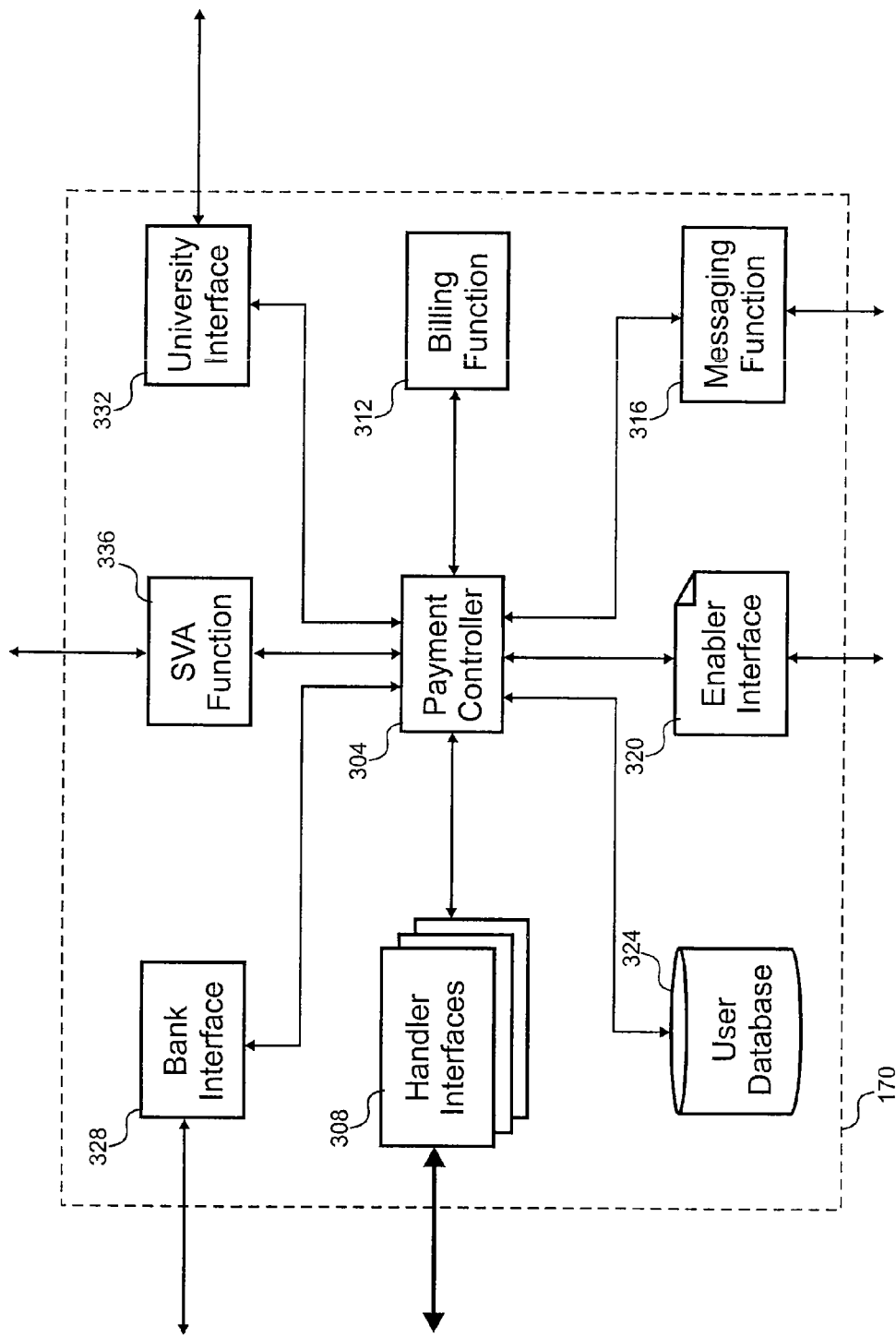
FIG. 3B is a block diagram of another embodiment of the payment enabler with the bank interface, stored value account function and a university interface.

With reference to FIG. 3B, a block diagram of another embodiment of the payment enabler 170-2 with the bank interface 328, stored value account function 336 and a university interface 332 is shown. As one example, the embodiment of the OMTS 190 in FIG. 1D uses this embodiment of the payment enabler 170-2. The operation of the payment enabler 170-2 is largely the same as the above embodiment except for the addition of the stored value account function 336 and the university interface 332. The following discussion largely focuses on those distinctions.

The stored value account function 336 interfaces with the stored value accounts 175 maintained in the OMTS 190. This function 336 adds or removes funds and deducts the fees with the billing function 312. In this embodiment, the stored value account 175 for each student 130 is just stored in an entry of the user database 324 corresponding to a particular unique identifier. In some embodiments, the stored value accounts 175 could be separate accounts where credits are stored outside the user database 324.

The university interface 332 is used to record purchases from the community 115 and to verify to the community 115 that adequate credit is in the stored value accounts 175. When a purchase is made by the student 130, the credit amount in the stored value account 175 is reduced and a transfer is made to the university account 195 maintained by the bank 140. A fee could be deducted by the billing function 312 from the amount transferred to the university account 195. The payment enabler may use the university interface 332 to query the student ID database 165 when adding funds to verify a valid unique identifier is being used.

Referring next to FIG. 3C, a block diagram of yet another embodiment of the payment enabler 170-3 with the stored value account function 336 and the university interface 332 is shown. This embodiment of the payment enabler 170-3 is used, for example, with the embodiment of the OMTS 190 of FIG. 1E. This embodiment of the OMTS 190 has stored value accounts 175 for both the students and the university. When purchases are made, a transfer occurs between the stored value account 175 of the student 130 to the stored value account 175 of the university.

Figure 4:
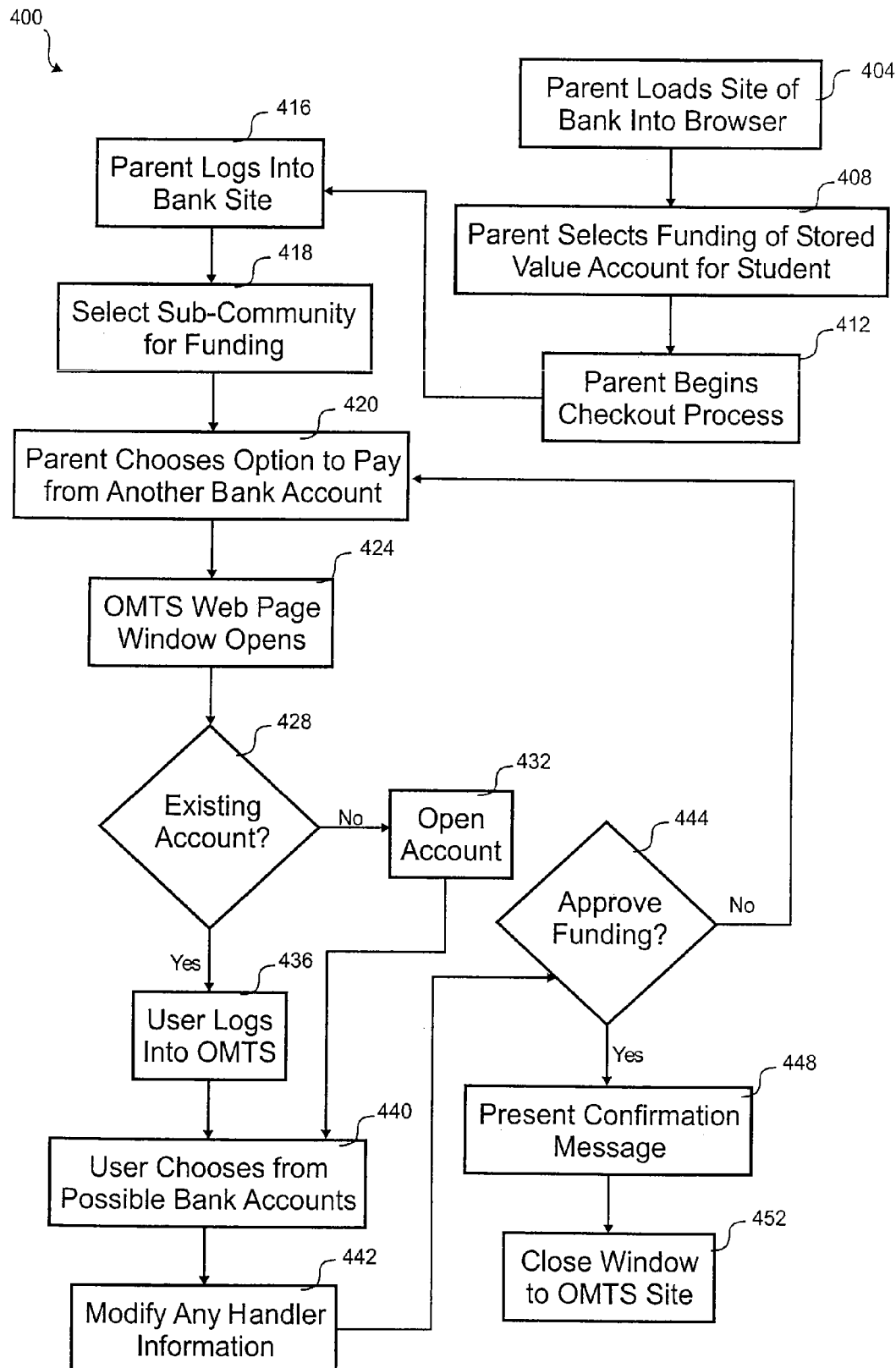
FIG. 4 is a flow diagram of an embodiment of a process that a parent or payor would use to add funds for use in the purchasing community.

With reference to FIG. 4, a flow diagram of an embodiment of a process 400 that a parent or payor 110 would use to add funds for use in the purchasing community 115 is shown. The depicted portion of the process 400 begins in step 404 where the parent 110 loads the bank site 145 into the payin interface 120. In step 408, the parent 110 selects an option on the bank web site 140 to fund the stored value account 175 for a student 130. At that point, the parent logs into the bank site at step 416. The parent may be presented with a number of schools to fund, whereafter one university is chosen. In step 418, a subcommunity 153 is chosen if segregation of the purchasing community 115 supported.

The parent is presented a number of possible handlers 160 that may be used to fund the stored value account 175. The bank site 145 may support some of these options while the OMTS 190 may support others. In some cases, there may be duplication such that both the bank site 145 and the OMTS supports a particular handler 160. Of all the options, the parent chooses to pay with the OMTS 190 using a bank handler 160-4 in step 420. The browser is redirected to the OMTS 190 or another browser window is opened that points to the OMTS 190 in step 424. Where a new window is opened, it overlays the window of the bank site 145 such that after the process finishes, the bank site window is fully revealed after closing the window to the OMTS 190. The new window may only partially cover the window to the bank site 145.

If the parent does not have an existing account with the OMTS 190 as determined in step 428, one is opened in step 432. Opening an account adds an entry in the user database 324 for both the parent 110 and student 130. Contact information, the unique identifier of the student 130, handler information, and other preferences are added to the user database 324 during account creation. Some of this information is verified for accuracy by the payment controller 304. If there is an existing account as determined in step 428, the parent logs into the OMTS 190 in step 436.

In some cases, a number of possible bank accounts can be processed by the bank handler 160-4 to provide alternative sources of funding. In step 440, one bank account is chosen if there are more than one. In step 442, the parent 110 may be given the option of modifying the handler information, for example, the bank account and routing number. The parent 110 may choose to approve funding in step 444, whereafter a confirmation message is presented in step 448. In step 452, the window is closed to the OMTS 190 to fully reveal the underlying window of the bank site 145. If the funding is not approved for some reason in step 444, processing loops back to step 420 where another bank account could be chosen.

Figure 5:
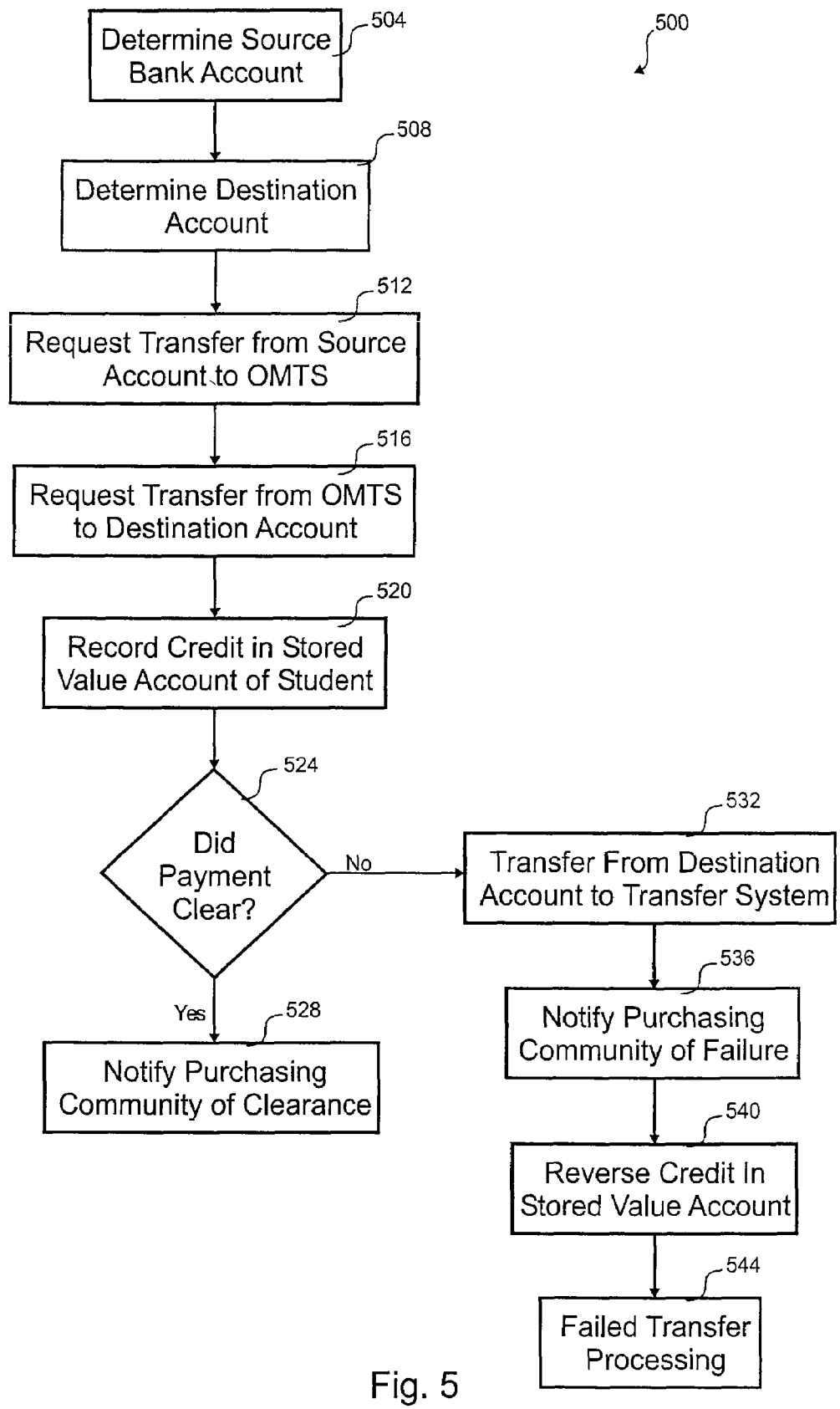
FIG. 5 is a flow diagram of an embodiment of a process that the purchase system would go through when funding the stored value account of a student.

Referring next to FIG. 5, a flow diagram of an embodiment of a process 500 is shown that the purchase system 100 would go through when funding the stored value account 175 of a student 130. The depicted portion of the process begins in step 504 where the source bank account is determined by the payment controller 304 querying the user database 324 for handler information on the parent 110. The destination bank account 195 for the university is determined in step 508. Some embodiments may have multiple destination accounts corresponding to sub-communities 153 that the parent can select individually for funding. The selection of the parent is used to determine which of the university accounts 195 to fund.

In step 512, the transfer from account of the parent to the OMTS 190 is performed using the bank handler 160-4. The bank handler 160-4 may use the ACH network or other conventional systems to transfer the funds. Even though the transfer to the OMTS 190 may not have cleared yet, a second transfer from OMTS 190 to the university account 195 is made after deducting any fees. A credit is recorded in the stored value account 175 of the student. Although this embodiment transfers funds through the OMTS 190 as an intermediary, some embodiments could transfer funds directly from the account of the parent to the university account 195.

This embodiment makes the funds immediately available in the student's stored value account 175 even though they may have not cleared. In step 524, it is determined if the transfer from the account of the parent has cleared. If the funds clear, the purchasing community is notified in step 528. Where the funds do not clear, the funds previously transferred to the university account 195 are transferred back to the OMTS 109 in step 532. The purchasing community 115 is notified that the transfer would not clear in step 536. In step 540, the purchasing community 115 reverses the credit in the stored value account 175 of the student 130. Further processing of the failed transfer is preformed in step 544 and could include resubmitting the request, notifying the parent wit the messaging function 316, or other steps.

Figure 6:
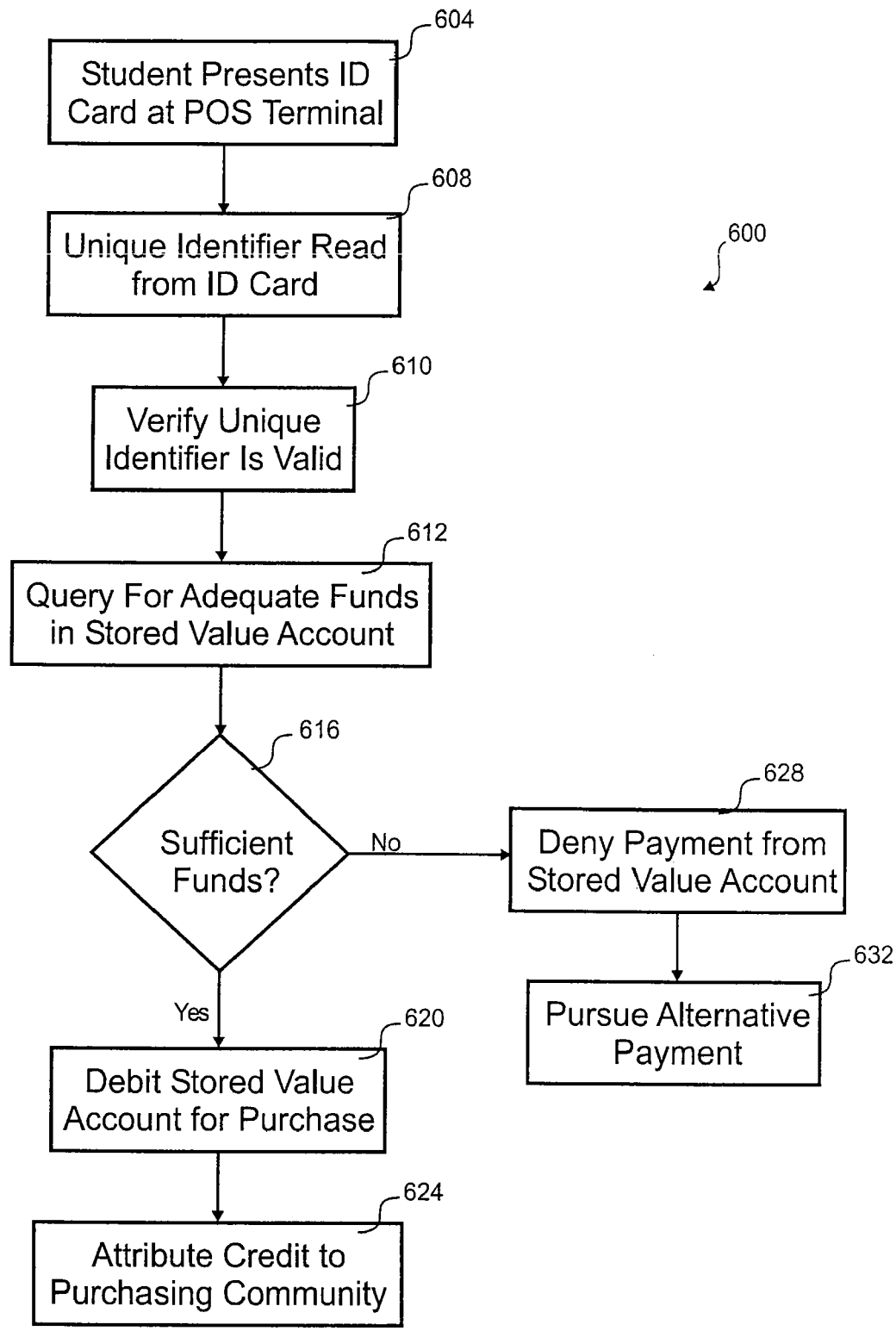
FIG. 6 is a flow diagram of an embodiment of a process that a student or purchaser would use to purchase something using the payment system.

With reference to FIG. 6 is a flow diagram of an embodiment of a process 600 that a student or purchaser 130 would use to buy something using the payment system 100. The depicted portion of the process 600 begins in step 604 when a unique identifier is presented at the POS terminal 135 by the student 130. In this embodiment, an ID card is presented that has a magnetic stripe encapsulating the unique identifier, but any machine-readable medium could be used. The unique identifier is read in step 608 by swiping the card through a card reader. The unique identifier is verified by the university system 155 querying the student ID database 165 in step 610. A query is made in step 612 to determine if adequate credit is in the stored value fund 175.

The presence in the stored value account 175 of sufficient funds is verified in step 616. Where the funds are adequate, the stored value fund 175 is debited in step 620. The purchasing community is notified of the purchase and the credit is attributed to the purchasing community in step 624. Where it is determined in step 616 that there are not adequate funds in the stored value account, payment is denied in step 628. Alternative payment may be pursued in step 632 or the sale can be abandoned.

In embodiments where there are multiple sub-communities 153, the POS terminal can determine which sub-community 153 a particular item is associated with. A sub-division of the stored value account is deducted credit to pay for the item. That sub-community 153 associated with the item is attributed the benefit of the sale. A given checkout process may have items from a number of purchasing sub-communities such that multiple balance checks are performed during checkout.

A number of variations and modifications of the invention can also be used. For example, the purchasing community could be any education institution, theme park, resort, campus, system of resorts, system of campuses, transportation system, or other closed community of vendors. The vending members of the purchasing community could be owned by the purchasing community or independently owned and associated with the purchasing community. For example, lift tickets bought from a ski resort is an interaction with the ski resort, but a meal bought at an independent restaurant on the mountain is an interaction separate from the ski resort, but could be paid through the payment community just the same.

Some of the above embodiments are explained in the context of purchasing community for a university, but the invention should not be so limited. The parent could be interchanged with the student or any other person funding a stored value account. The student could be any purchaser with a unique identifier recognized in the purchasing community.

Related to the above inventions, an organization's gift matching program could be improved in various embodiments. Organizations, such as businesses, often match the charitable gifts of employees within some guidelines. A conventional paper form asking for an employee identifier and information on the charity might conventionally be used. In this embodiment, the information on the conventional paper form is entered on-line. The form could be customized with branding and other information for the particular organization. Further customizations could include the charities available and the amounts to give, etc.

The employee can use a credit card, a debit card, a bank account, or retail location to fund the gift by interfacing with or providing information about the appropriate handler. The charity could have a stored value account with the payment enabler or a separate bank account. When the form information is entered satisfactorily, the funds are transferred from the employee's handler along with matching funds from the employer's handler. The information entered and other stored information is displayed for printing a receipt of the transaction that could assist in tax preparation, for example. The employer could accept the form as a record of the transaction or could receive some or all information electronically in a message. For messages, the messaging function could be used to notify the employer and/or employee.

While the principles of the invention have been described above in connection with specific apparatuses and methods, it is to be clearly understood that this description is made only by way of example and not as limitation on the scope of the invention.

What is claimed is:

1. A payment system for a closed purchasing community where stored value accounts are funded over the Internet, the payment system comprising:
   a plurality of point of sale terminals associated with the closed purchasing community;
   a database comprising a unique identifier for each of a plurality of participants in the closed purchasing community;

a plurality of indicators for presentment at the plurality of point of sale terminals that allow determining the unique identifier, wherein:
- each unique indicator has a credit amount associated therewith,
- each of the plurality of indicators corresponds to a stored value account,
- debits are applied to the credit using the point of sale terminals, and
- the unique indicator is usable exclusively within the closed purchasing community to access the database; and an online money transfer system that obtains the credit amount from at least one of a plurality of handlers, wherein:
- the online money transfer system is separate from the closed purchasing community,
- the online money transfer system is accessible from the Internet,
- the online money transfer system passes credits from open systems to stored value accounts of the closed purchasing community, and
- each of the plurality of handlers operate in an open system to transfer the credit into a stored value account.

2. The payment system for the closed purchasing community where stored value accounts are funded over the Internet as recited in claim 1, wherein the credit amount is obtained from a bank handler.

3. The payment system for the closed purchasing community where stored value accounts are funded over the Internet as recited in claim 1, wherein a purchase with one of the plurality of point of sale terminals is reflected in a first stored value account associated with the unique identifier that is used in the purchase.

4. The payment system for the closed purchasing community where stored value accounts are funded over the Internet as recited in claim 1, wherein the online money transfer system comprises a first plurality of stored value accounts separate from the stored value accounts of the closed purchasing community.

5. The payment system for the closed purchasing community where stored value accounts are funded over the Internet as recited in claim 1, further comprising a bank that includes a plurality of stored value accounts corresponding to the plurality of indicators.

6. The payment system for the closed purchasing community where stored value accounts are funded over the Internet as recited in claim 1, wherein the purchasing community is associated with one of: an education institution, a theme park, a resort, a campus, a system of resorts, a system of campuses, and a transportation system.

7. A method for funding an account of a buyer with an online money transfer system using a wide area network, where the account cannot be used for purchases outside a closed purchasing community, the method comprising steps of:
- accepting information about a money handler at the online money transfer system, wherein:
  - the information is accepted over the wide area network,
  - the money handler functions with an open system,
  - the information includes an amount of funds, an open system account number and a unique identifier,
  - the open system account number is usable in the open system to uniquely identify a source of funds, and
  - the unique identifier discriminates the buyer from other buyers in the closed purchasing community;
- drawing funds with the money handler from the open system account number, wherein the funds are a function of the amount;
- transferring funds from the open system to the account in the closed purchasing community for benefit of the buyer indicated by the unique identifier, wherein:
  - the funds cannot be used outside the closed purchasing community while in the account,
  - the account corresponds to a stored value account, and
  - the stored value account is available to fund transactions in the closed purchasing community; and
- funding transactions from the account of the buyer associated with the unique identifier, wherein the funds are drawn from the stored value account of the closed purchasing community without needing interaction with the open system to clear a transaction.

8. The method for funding the account of the buyer with the online money transfer system using the wide area network, where the account cannot be used for purchases outside the closed purchasing community as recited in claim 7, wherein:
- the closed purchasing community is divided into a plurality of sub-communities, and
- the information includes an indication of which of the plurality of sub-communities should realize the funds if a purchase is made by the buyer from that sub-community.

9. The method for funding the account of the buyer with the online money transfer system using the wide area network, where the account cannot be used for purchases outside the closed purchasing community as recited in claim 7, further comprising steps of:
- receiving a request from the closed purchasing community to debit the account;
- debiting the account in response to the funding step; and
- crediting the closed purchasing community in response to the funding step.

10. The method for funding the account of the buyer with the online money transfer system using the wide area network, where the account cannot be used for purchases outside the closed purchasing community as recited in claim 9, wherein the crediting step comprises steps of:
- determining a vending member or sub-community of the purchasing community requesting the debit, and
- crediting a second account associated with the vending member or sub-community.

11. The method for funding the account of the buyer with the online money transfer system using the wide area network, where the account cannot be used for purchases outside the closed purchasing community as recited in claim 9, wherein the crediting step comprises steps of:
- electronically transferring payment to a bank; and
- indicating to the bank an account of the purchasing community for a credit.

12. The method for funding the account of the buyer with the online money transfer system using the wide area network, where the account cannot be used for purchases outside the closed purchasing community as recited in claim 7, wherein the unique identifier is machine readable and is used in the closed purchasing community to also authenticate identity of the buyer.

13. The method for funding the account of the buyer with the online money transfer system using the wide area network, where the account cannot be used for purchases outside the closed purchasing community as recited in claim 7, wherein the online money transfer system is separate from both a holder of the account and the purchasing community.

14. The method for funding the account of the buyer with the online money transfer system using the wide area network, where the account cannot be used for purchases outside the closed purchasing community as recited in claim 7, wherein the information further comprises an e-mail address for sending messages related to the unique identifier.

15. The method for funding the account of the buyer with the online money transfer system using the wide area network, where the account cannot be used for purchases outside the closed purchasing community as recited in claim 7, wherein the account is a stored value account.

16. The method for funding the account of the buyer with the online money transfer system using the wide area network, where the account cannot be used for purchases outside the closed purchasing community as recited in claim 7, wherein:
   the closed purchasing community is comprised of a plurality of vending sites, and
   each the plurality of vending sites includes at least one point of sale terminal.

17. The method for funding the account of the buyer with the online money transfer system using the wide area network, where the account cannot be used for purchases outside the closed purchasing community as recited in claim 7, wherein the money handler is chosen from the group consisting of: a retail store handler, a credit card handler, a debit card handler, and a bank handler.

18. The method for funding the account of the buyer with the online money transfer system using the wide area network, where the account cannot be used for purchases outside the closed purchasing community as recited in claim 7, wherein the accepting step includes a step of accepting information from an Internet web interface.

19. The method for funding the account of the buyer with the online money transfer system using the wide area network, where the account cannot be used for purchases outside the closed purchasing community as recited in claim 7, wherein the accepting step includes a step of accepting the information that is manually entered.

20. A method for funding a stored value account with an online money transfer system using a wide area network, where the stored value account is used in a closed purchasing community, the method comprising steps of:
   receiving a first request to interface with the online money transfer system, wherein the first request originates from another site on the wide area network;
   accepting information about a money handler at the online money transfer system, wherein:
     the information is accepted from the wide area network,
     the money handler functions with an open system,
     the information can be used to derive: an amount of funds, an open system account number and a unique identifier,
     the open system account number is usable in the open system to uniquely identify a source of funds, and
     the unique identifier discriminates a buyer from other buyers in the closed purchasing community;
   transferring money from the money handler to the stored value account associated with the unique identifier, wherein:
     the stored value account is usable in the closed purchasing community, and
     a credit is placed in the stored value account based upon the transferring step;
   receiving a second request, wherein the second requests indicates a debit to the stored value account;
   debiting the stored value account in response to the receiving step, wherein the debit is from a purchase at a point of sale terminal within the closed purchasing community, and
   crediting the closed purchasing community in response to the debiting step.

21. The method for funding the stored value account with the online money transfer system using the wide area network, where the stored value account is used in the purchasing community, as recited in claim 20, wherein:
   the information further comprises a sub-community designation, and
   the crediting step comprises crediting a sub-community indicated by the sub-community designation.

22. The method for funding the stored value account with the online money transfer system using the wide area network, where the stored value account is used in the purchasing community, as recited in claim 20, further comprising a step of choosing a type of money handler, wherein the type at least includes a bank handler.

23. The method for funding the stored value account with the online money transfer system using the wide area network, where the stored value account is used in the purchasing community, as recited in claim 20, wherein the crediting step comprises steps of:
   electronically transferring payment to a bank; and
   indicating to the bank an account of the purchasing community to credit.

24. The method for funding the stored value account with the online money transfer system using the wide area network, where the stored value account is used in the purchasing community, as recited in claim 20, wherein the stored value account is a bank account.

25. The method for funding the stored value account with the online money transfer system using the wide area network, where the stored value account is used in the purchasing community, as recited in claim 20, wherein the crediting step comprises steps of:
   determining a sub-community of the purchasing community requesting the debit, and
   crediting an account associated with the sub-community.

* * * * *